(12) United States Patent
Boehmer et al.

(10) Patent No.: US 7,325,190 B1
(45) Date of Patent: Jan. 29, 2008

(54) INTERFACE SYSTEM AND METHOD OF BUILDING RULES AND CONSTRAINTS FOR A RESOURCE SCHEDULING SYSTEM

(76) Inventors: Tiffany D. Boehmer, 1752 Crane Ave., Mountain View, CA (US) 94040; Gal Josefsberg, 10305 Calvert Dr., Cupertino, CA (US) 95014; Gary Todd Aoki, 383 Surber Dr., San Jose, CA (US) 95123

( * ) Notice: Subject to any disclaimer, the term of this patent is extended or adjusted under 35 U.S.C. 154(b) by 1072 days.

(21) Appl. No.: 09/680,131

(22) Filed: Oct. 2, 2000

(51) Int. Cl.
G06F 15/00 (2006.01)

(52) U.S. Cl. .................. 715/517; 715/517; 715/503; 705/8

(58) Field of Classification Search ............... 715/507, 715/505, 517, 503; 705/9, 8
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,829,423 A | 5/1989 | Tennant et al. |
| 4,905,163 A | 2/1990 | Garber et al. |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |

(Continued)

FOREIGN PATENT DOCUMENTS

EP 0453128 A2 10/1991

(Continued)

OTHER PUBLICATIONS

Wyman, Paul, "Common Features of Simulation Based Scheduling", Proceedings of the 23rd Conference on Winter Simulation, 1991, pp. 341-347.*

(Continued)

Primary Examiner—William Bashmore
Assistant Examiner—Quoc A. Tran
(74) Attorney, Agent, or Firm—Thomas, Kayden, Horstemeyer & Risley, LLP

(57) ABSTRACT

The present invention is an interface system for interactively building rules and constraints. The interface system comprises of an output display configured to show a user a partial complete rule with a current rule fragment, such rule fragment comprising a blank space. The user can fill in the blank space by either choosing from a list or by typing in text in the blank space. After the blank space is filled, a completed rule is generated. The interface system then assigns this rule to one or more person in a resource scheduling system. The present invention can be used for agent scheduling in a call center environment.

24 Claims, 2 Drawing Sheets

U.S. PATENT DOCUMENTS

| | | |
|---|---|---|
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,444,632 A | 8/1995 | Kline et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,584,024 A | 12/1996 | Shwartz |
| 5,590,171 A | 12/1996 | Howe et al. |
| 5,590,322 A | 12/1996 | Harding et al. |
| 5,592,668 A | 1/1997 | Harding et al. |
| 5,596,502 A | 1/1997 | Koski et al. |
| 5,597,312 A | 1/1997 | Bloom et al. |
| 5,619,183 A | 4/1997 | Ziegra et al. |
| 5,640,501 A * | 6/1997 | Turpin .................. 715/507 |
| 5,682,542 A | 10/1997 | Enomoto et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,802,255 A | 9/1998 | Hughes et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,909,678 A | 6/1999 | Bergman et al. |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,968,115 A | 10/1999 | Trout |
| 5,978,648 A | 11/1999 | George et al. |
| 5,982,857 A | 11/1999 | Brady |
| 5,987,466 A | 11/1999 | Greer et al. |
| 5,987,481 A * | 11/1999 | Michelman et al. ........ 715/503 |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIllwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,547 B1 | 4/2002 | Eftink |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIllwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,587,831 B1 * | 7/2003 | O'Brien .................. 705/8 |
| 6,601,034 B1 * | 7/2003 | Honarvar et al. .............. 705/7 |
| 6,606,657 B1 | 8/2003 | Zilberstein et al. |
| 6,611,846 B1 * | 8/2003 | Stoodley .................. 707/104.1 |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIllwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,315 B1 * | 11/2004 | Bucci et al. .................. 705/9 |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 6,970,829 B1 * | 11/2005 | Leamon .................. 705/9 |
| 2001/0000962 A1 | 5/2001 | Rajan |
| 2001/0032335 A1 | 10/2001 | Jones |

| | | | |
|---|---|---|---|
| 2001/0043697 | A1 | 11/2001 | Cox et al. |
| 2002/0038363 | A1 | 3/2002 | MacLean |
| 2002/0052948 | A1 | 5/2002 | Baudu et al. |
| 2002/0059205 | A1* | 5/2002 | Graham et al. ............... 707/3 |
| 2002/0065911 | A1 | 5/2002 | Von Klopp et al. |
| 2002/0065912 | A1 | 5/2002 | Catchpole et al. |
| 2002/0128925 | A1 | 9/2002 | Angeles |
| 2002/0143925 | A1 | 10/2002 | Pricer et al. |
| 2002/0165954 | A1 | 11/2002 | Eshghi et al. |
| 2003/0055883 | A1 | 3/2003 | Wiles et al. |
| 2003/0079020 | A1 | 4/2003 | Gourraud et al. |
| 2003/0144900 | A1 | 7/2003 | Whitmer |
| 2003/0154240 | A1 | 8/2003 | Nygren et al. |
| 2004/0100507 | A1 | 5/2004 | Hayner et al. |
| 2004/0165717 | A1 | 8/2004 | McIlwaine et al. |
| 2005/0013560 | A1 | 6/2005 | Lee et al. |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"Customer Spotlight: Navistar International," Web page, unverified print date of Apr. 1, 2002.

"DKSystems Integrates QM Perception with OnTrack for Training," Web page, unverified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"Price WaterouseCoopers Case Study" The Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 152, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosy et al., "Distributed intelligent tutoring on the Web," Proceedings of the 8th World Conference of the AIED Society, Kobe, Japan, Aug. 18-22, pp. 1-9 Web page, unverified print date Apr. 12, 2002, unverified cover date of Aug. 18-22, 1997.

Brusilovsky and Pesin, ISIS-Tutor: An Intelligent Learning Environment for CD/ISIS Users, pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical Skills and Training* pp. 25-27 (Oct. 1995).

Cohen, "Knowledge Management's Killer App," pp. 1-11, Web page, unverified print date Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8(© 2001).

Cybulski and Linden, "Teaching Systems Analysis and Design Using Multimedia and Patterns," unknown date, unknown source.

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report,"*Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*E-Learning the future of learning* THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support,"*Technical Skills and Training* pp. 25-27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring,"*Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of End-User Training Needs," *Communications ACM* 38(7):27-39 (Jul. 1995).
O'Herron, "CenterForce Technologies CenterForce Analyzer," Web page unverified print dateof Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations, authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3):17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1, pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).

Witness Systems promotional brochure for eQuality entitled "Bringing eQuality to Business".
Witness Systems promotional brochure for eQuality entitled "Building Customer Loyalty Through BusinessDriven Recording of Multimedia Interactions in your Contact Center," (2000).
Aspect Call Center Product Specification, "Release 2.0", Aspect Telecommunications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst, *It's Baa-aack. How Interative TV is Sneaking Into Your Living Room*, The AnchorDesk, May 10, 1999.
Berst, *Why Interactive TV Won't Turn You On (Yet)*, The AnchorDesk, Jul. 13, 1999.
Borland and Davis, *US West Plans Web Services on TV*, CNETNews.com, Nov. 22, 1999.
Brown, *Let PC Technology Be Your TV Guide*, PC Magazine, Jun. 7, 1999.
Brown, *Interactive TV: The Sequel*, NewMedia, Feb. 10, 1998.
Cline, Déjà vu—*Will Interactive TV Make It This Time Around?*, DevHead, Jul. 9, 1999.
Crouch, *TV Channels on the Web*, PC World, Sep. 15, 1999.
D'Amico, *Interactive TV Gets $99 set-top box*, IDG.net, Oct. 6, 1999.
Davis, *Satellite Systems Gear Up for Interactive TV Fight*, CNETNews.com, Sep. 30, 1999.
Diederich, *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger, *The Internet Meets the Couch Potato*, PCWorld, Oct. 1996.
*Hong Kong Comes First with Interactive TV*, SCI-TECH, Dec. 4, 1997.
*Interactive TV Overview TimeLine*, Interactive TV News.
*Interactive TV Wars Heat Up*, Industry Standard.
Needle, *Will The Net Kill Network TV?* PC World Online, Mar. 10, 1999.
Kane, *AOL-Tivo: You've Got Interactive TV*, ZDNN, Aug. 17, 1999.
Kay, *E-Mail in Your Kitchen*, PC World Online, 093/28/96.
Kenny, *TV Meets Internet*, PC World Online, Mar. 28, 1996.
Linderholm, *Avatar Debuts Home Theater PC*, PC World Online, Dec. 1, 1999.
Mendoza, *Order Pizza While You Watch*, ABCNews.com.
Moody, *WebTV: What the Big Deal?*, ABCNews.com.
Murdorf, et al., *Interactive Television—Is There Life After the Internet?*, Interactive TV News.
Needle, *PC, TV or Both?*, PC World Online.
*Interview with Steve Perlman*, CEO of Web-TV Networks, PC World Online.
Press, *Two Cultures, The Internet and Interactive TV*, Universite de Montreal.
Reuters, *Will TV Take Over Your PC?*, PC World Online.
Rohde, *Gates Touts Interactive TV*, InfoWorld, Oct. 14, 1999.
Ross, *Broadcasters Use TV Signals to Send Data*, PC World Oct. 1996.
Schlisserman, *Is Web TV a Lethal Weapon?*, PC World Online.
Stewart, *Interactive Television at Home: Television Meets the Internet*, Aug. 1998.
Swedlow, *Computer TV Shows: Ready for Prime Time?*, PC World Online.
Wilson, *U.S. West Revisits Interactive TV*, Interactive Week, Nov. 28, 1999.

\* cited by examiner

INTERFACE SYSTEM AND METHOD OF BUILDING RULES AND CONSTRAINTS FOR A RESOURCE SCHEDULING SYSTEM

CROSS-REFERENCE TO RELATED APPLICATIONS

This application is related to commonly assigned U.S. application Ser. No. 09/056,219 by Andre et al., filed Apr. 7, 1998, now U.S. Pat. No. 6,278,978, the specification of which is incorporated herein by reference in its entirety.

FIELD OF THE INVENTION

This invention relates to computer systems and computer-implemented methods for generating and optimizing schedules for a collection of personnel. In particular, the invention relates to methods for optimizing personnel schedules to satisfy variable staffing requirements and shift constraints.

BACKGROUND OF THE INVENTION

The task of creating an efficient schedule for a collection of personnel is known to be a very complex constraint satisfaction problem. The problem becomes even more complex when the number of personnel is large, or when there are variable constraints upon the shifts such as the number of breaks within an person's shift, the scheduling of the breaks within a shift, and the lengths of the breaks.

Traditionally, scheduling is performed manually. Because the manual preparation of schedules is very laborious, however, computerized scheduling methods have been devised to perform the task of scheduling. Although computerized scheduling is far faster than manual scheduling, it often does not produce schedules that make the most efficient use of personnel. One major reason for the difficulty in producing efficient schedules is that the scheduling problem is a computational problem of type NP-complete, i.e. the only known algorithms to solve the problem require an amount of time that grows exponentially with the size of the problem. There are no known algorithms, therefore, which can perfectly solve the scheduling problem in less than exponential time. The problem of generating a good schedule, therefore, requires computational techniques for maximizing the schedule's efficiency while minimizing the amount of computational time, and inherently involves trade-offs that are peculiar to each specific application.

Traditional resource scheduling software packages include little or no mechanisms for the user to specify customized rules of a highly expressive nature. Instead, the user must simply follow a strict workflow imposed by the software or the user must specify constraints in great detail, requiring for example specifications of every particular personnel and every particular case of the rule individually.

Microsoft Outlook™ and other software products include simple interfaces for creating meaningful sentences using drag-and-drop actions. The structure of the "sentences" is not dynamically based on inputs by the user in general. They are fixed branches of possible values and sets of values. A real-time database lookup feature is not part of these systems.

U.S. Pat. No. 5,909,678 teaches building statements by dragging and dropping templates and components, and is specific to a system with selectable objects (for the "blanks") only.

U.S. Pat. No. 5,682,542 is very specific to construction of statements containing noun and verb objects only.

U.S. Pat. Nos. 5,590,322 and 5,592,668 teach designing queries for an information system, including a drag-and-drop method for creating the queries, but include only a system that maps the query to a specific internal structure (the fact tree representation).

U.S. Pat. No. 5,584,024 teaches a narrow database query system. However, the system includes a user interface allowing a user to select from tables to create queries that are guaranteed to be syntactically and semantically correct, and thus conform to a strict grammar.

U.S. Pat. No. 4,829,423 generally teaches any interface for users to create sentences from a specified grammar, including a means for generating all possible choices midway through the process based on user inputs thus far.

U.S. Pat. No. 5,802,255 teaches a user interface design that enables building rules in the area of intelligent interaction with rules. However, the rules taught are specifically condition-action rules and are thus highly structured.

U.S. Pat. No. 5,596,502 is a narrow manufacturing application. U.S. Pat. No. 5,444,632 describes factory lot processing and scheduling methods.

OBJECTS AND ADVANTAGES OF THE INVENTION

Accordingly, it is a primary object of the present invention to overcome the limitations of the prior art rule building interface methods. More specifically, it is an object of the invention to provide a fast, efficient and flexible computer-implemented method to specify constraints and other business rules to be considered in a scheduling system.

SUMMARY OF THE INVENTION

These objects and advantages are attained by a novel computer-implemented method for improving a person's schedule. The method is distinguished from the prior art by numerous advantageous features. For example, the method is more versatile than the prior art, because of inclusion of two input devices, and because of the fact that the resulting rules are not in fact forced to satisfy a particular grammar. The ability to express self-referential and abstract qualities are also improvements over existing solutions. Further, many existing methods require a database as part of the essential mechanism, whereas the interface of the present invention does not in principle require a database.

The present invention is an interface system for interactively building rules and constraints. The interface system comprises of an output display configured to show a user a partial rule with a current rule fragment, such rule fragment comprising a blank space; the output display is further configured to show a user a list of potential selections for filling the blank space in the current rule fragment; the output display also shows a user a completed rule wherein the completed rule should be easily parsed by a human user; and at least one input device configured to allow a user to choose from a list a desired selection for filling the blank space and for allowing a user to directly enter values to create a selection for filling the blank space, thereby creating a completed rule. The input device can also assign a tolerance to the completed rule, whereby the completed rule is made self-referential. A completed self-referential rule refers to a goal that is unspecified in an absolute sense or to a schedule that does not yet exist.

The interface system further comprises a processing element configured to apply branching rules to previous selections of a user for filling the blank space, thereby interactively and dynamically creating future blank spaces and future lists of the potential selections. Alternatively, the interface system can include a processing element configured to access a dynamic database, thereby to populate the lists of potential selections depending on the current value in real time of the dynamic database.

The interface system further comprising a processing element configured for converting a completed rule into an internal representation suitable for inputting into a resource scheduling system. The interface system also assigns the completed rule to at least one person in a resource schedule.

The interface system of the present invention can be used for resource scheduling of call center agents in a call center as well as other resource scheduling applications.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

One embodiment of the present invention involves unscheduling one or more personnel from their shifts in the schedule, so that their shifts are empty. These personnel, or a portion of these personnel are then rescheduled for different possible shifts so that various possible schedules are formed. Each of these possible schedules are evaluated with a score function and based on the scores, an improved schedule is selected from the possible schedules. The same process can also be applied to find an optimal schedule for breaks.

At the highest level, our method differs in that the system we propose is creating rules and not sentences in a grammar. One may argue that as long as the set of possible rules is finite, then this defines a grammar. Our set of rules differs depending on the state of the database and, therefore, it is not a fixed language. Furthermore, we improve on the method and specify by creating a self-referential component in the rules (fairness). And, we further improve by having not only some blanks filled by the user through selection from a list, but by enabling other blanks to be filled by the user through direction specification, without the need to choose from a list. These improvements make our method more expressive because it can more flexibly create an array of rules without being tied to one grammar.

Figure 1:
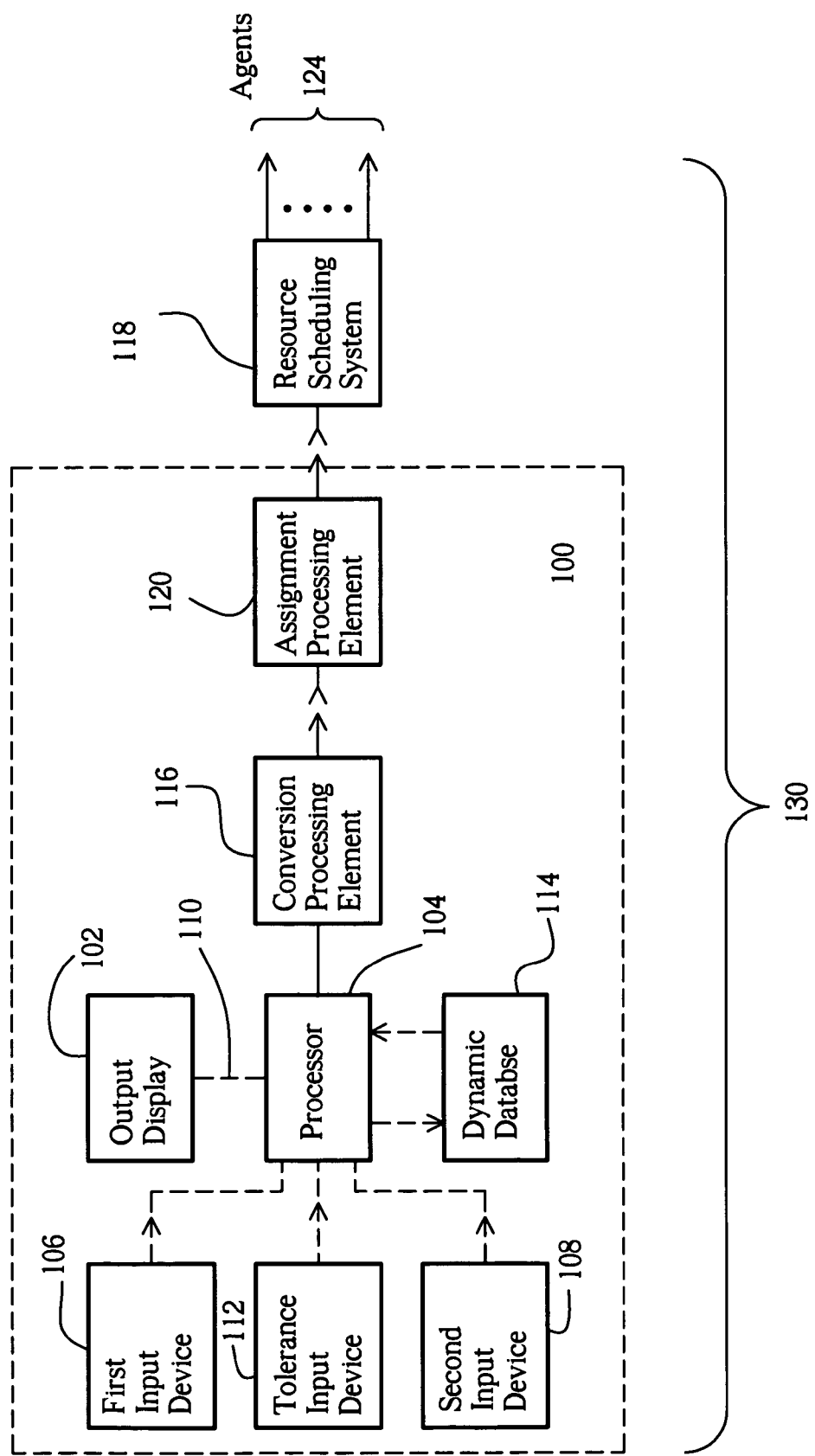
FIG. 1 is a block diagram indicating an interface system for building rules and constraints for a resource scheduling system, in accordance with the present invention.

FIG. 1 is a block diagram indicating an interface system 100 for building rules and constraints for a resource scheduling system, in accordance with the present invention. In an embodiment, interface system 100 incorporates an output display 102 for showing a user a current rule fragment having a blank space to be filled in by a user, thereby completing the rule. Output display 102 is interconnected through a wired or wireless data link 110 with an interface system processor 104. Interface system 100 contains input devices 106 and 108 configured for allowing the user to fill in the blank space. A first input device 106 allows the user to fill in the blank space by selecting from a list of potential selections displayed on output display 102. A second input device 108 allows the user to fill in the blank space by direct entry of open-ended values. An optional input device 112 allows the user to specify a self-referential constraint or tolerance (e.g., a rule is X and this rule must be complied within a tolerance of Y). Such a self-referential rule can refer to a goal that is unspecified in an absolute sense or to a schedule that does not yet exist. The function of optional input device 112 can alternatively be incorporated into either or both of the other input devices 106 and 108. The completed rule with the blank space filled is displayed at output display 102.

Interface system 100 is interactive, applying branching rules to previous selections of a user to create future blank spaces and future lists of potential selections. In some embodiments, interface system 100 includes a processing element that accesses a dynamic database 114, such that lists of potential selections are populated in accordance with the current value in real time of the dynamic database. In some embodiments, interface system 100 includes a processing element 116 for converting a completed rule into an internal representation suitable for inputting into a resource schedule system 118, e.g., a call center scheduling system. Processing element 116 can alternatively be included as part of interface system processor 104. A processing element 120 for assigning a completed rule to a person 124, e.g., a call center person, in a resource schedule 118, is optionally provided, either separately or contained within interface system processor 104.

In some embodiments, interface system 100 and resource scheduling system 118 are integrated into a common scheduling system 130, for example a call center scheduling system.

In an interface system according to the present invention, rules that result from the interface are easily parsed by a human user, but are not forced to follow any particular grammar. In some cases, the human user chooses an appropriate term from a list to fill a blank space, whereas in other cases, the human user creates a term to fill the blank space, without being bound to a list. In both of the above types of operation, which blanks exist and what terms are contained in future choice lists are guided dynamically by the user's former choices. The process includes an element that uses fixed branching rules, and an element that goes to a dynamic database and populates the lists depending on the current value of the database in real time. Part of the interface system is designed for the user to optionally specify a tolerance with which he wishes the scheduler to abide by the rule. In other words, the rules can be self-referential (e.g., "Joe works four times per month, with a tolerance of one"; "All employees work equal number of Saturday night shifts, with a tolerance of three.") The constraints can also be abstract and referential in the sense that they can refer to a schedule that does not yet exist (e.g., this rule is that everyone according to the final schedule should work on average the same number of Mondays.) This rule refers to the schedule (solution) that does not yet exist, without specifying a goal in an absolute sense. Further, the interface is designed such that these rules can first be created, then assigned or attached to one or more individual personnel (or objects of the rule).

Figure 2:
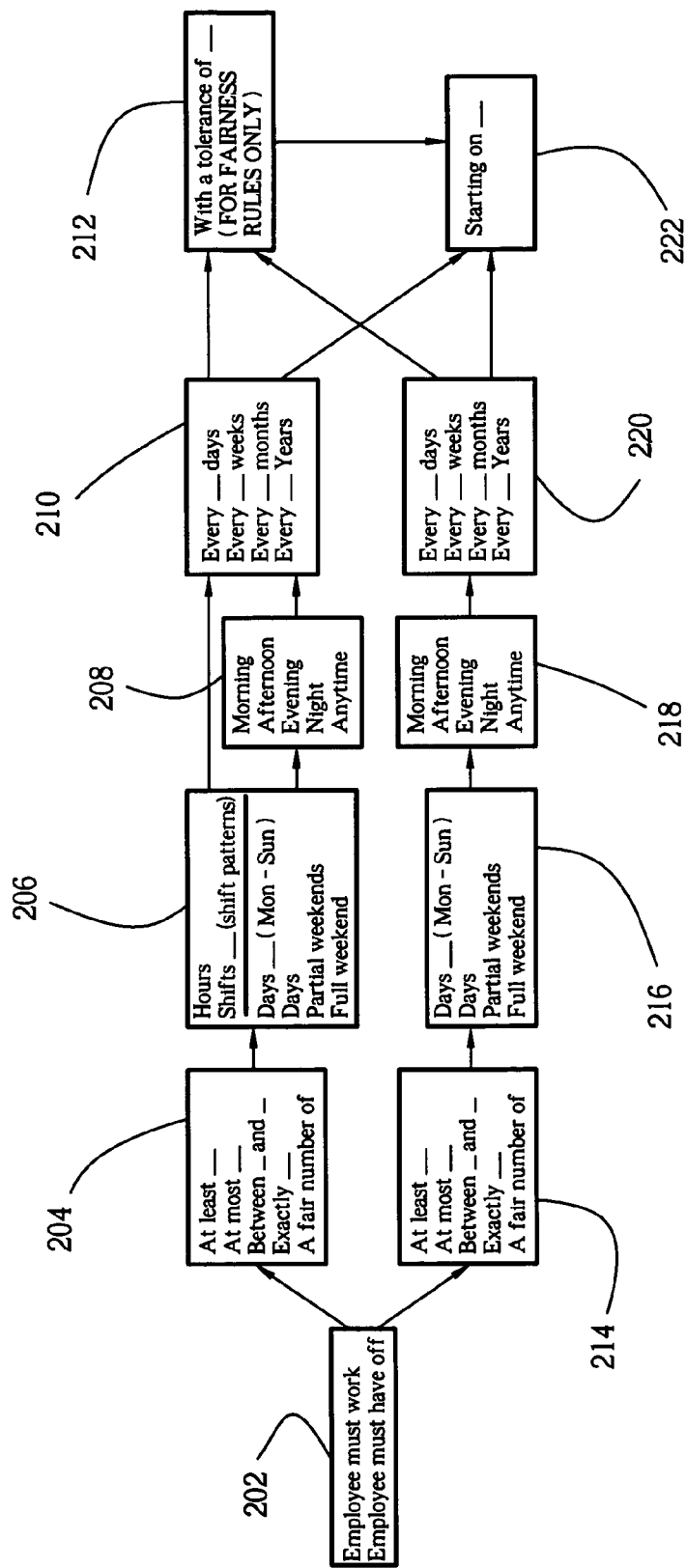
FIG. 2 is a flow diagram illustrating the operation of an embodiment of the interface system according to FIG. 1.

FIG. 2 is a flow diagram 200 illustrating one example of the operation of an embodiment of interface system 100. In the example of FIG. 2, at step 202 the user selects either "Employee must work . . . ," transferring operation to step 204; or "Employee must have off . . . ," which transfers operation to step 214. Steps 204 and 214 invite the user to fill in a value in an appropriate blank space. Steps 206 and 216 provide choices and blank fill-in 2' spaces to select calendar and/or time units. At step 206, the shifts (shift patterns) selection provides the user with a dynamically populated list of selections based on the current state of the database. Operation shifts from steps 206 and 216 respectively to steps 208 and 218, providing the user a choice of portions of the day before transferring operation to respective steps 210 and 220. Steps 210 and 220 provide a choice of repeat time intervals. Alternatively, step 208 and/or 218 are bypassed, providing operational flow directly from step 206 to step 210, or from step 216 to 220. The user can then direct operational flow from step 210 and/or step 220 to step 212, where tolerances are applied (for fairness rules only). Thereafter the user selects the start of the schedule at step 222. Alternatively, the user can bypass step 212 and execute step 222 directly after step 210 or step 220. The above operations illustrate the basic flow of the present invention. Other operations may be added, subtracted, or substituted from the basic flow depending on the specific problem situation.

It will be clear to one skilled in the art that the above embodiment may be altered or supplemented in many ways without departing from the scope of the invention. Additional variations will be obvious to those skilled in the art. Accordingly, the scope of the invention should be determined by the following claims and their legal equivalents.

What is claimed is:

1. A computer readable medium having a computer program for optimizing a schedule for scheduling a plurality of agents within a call center, the program for performing the steps of:
    generating an initial schedule for the plurality of agents within the call center according to at least one rule, comprising,
        displaying a current rule fragment that is a portion of a completed rule used to generate the initial schedule for the plurality of agents within the call center;
        accepting user input to create the completed rule from the rule fragment, wherein user input includes a selection from a displayed list, and a value directly entered by the user;
        accepting a tolerance input by the user, wherein the tolerance is placed on the completed rule;
        applying branching rules to previous user selections, such that future selection lists may be generated based on the previous user selections; and
        converting the completed rule into an internal representation suitable for input into a resource scheduling system for generating the initial schedule;
    removing a shift from the initial schedule, thereby creating a shift-reduced schedule, wherein the shift comprises at least one agent, at least one time slot, and at least one break offset value, wherein the initial and shift-reduced schedules comprise a plurality of shifts assigning the plurality of agents to time slots and to break offset values;
    creating a plurality of first schedules for the plurality of agents within the call center, the plurality of first schedules including adding an array of different first shifts individually to the shift-reduced schedule, wherein the first shifts are break-unspecified shifts and have indeterminate break times;
    evaluating a score function for each of the plurality of first schedules, wherein the first schedules have different first shifts added, wherein the different first shifts comprise all time slots in the schedule for which the plurality of agents can work;
    selecting a second schedule from among the plurality of first schedules, wherein the second schedule is characterized by a value of the score function; and
    scheduling the plurality of agents within the call center in accordance with the second schedule.

2. The program of claim 1, wherein generating an initial schedule according to at least one rule further comprises accessing a dynamic database to populate the displayed lists depending on current values in the dynamic database.

3. The program of claim 1, wherein generating an initial schedule according to at least one rule further comprises assigning the completed rule to at least one agent of the plurality of agents.

4. The program of claim 1 further comprising repeatedly removing, adding, evaluating, and selecting until a locally optimal schedule is obtained.

5. The program of claim of claim 1 further comprising:
    generating at least one break-unspecified shift, including unscheduling at least one break to make the breaks indeterminate;
    creating a plurality of first break times for each break-unspecified shift, including adding an array of different first break offset values
    for each break-unspecified shift, evaluating a score function for each of the plurality of first break times; and
    selecting a schedule having second break times from the first schedules having first break times, wherein the second break times are characterized by second scores.

6. The program of claim 5, wherein the plurality of predetermined values comprises four values corresponding to whether the interval in the first schedule corresponds to a first threshold of being understaffed, a second threshold of being understaffed, a first threshold of being overstaffed, or a second threshold of being overstaffed.

7. The program of claim 1, wherein the evaluation of the score function for the first schedule includes the calculation of a stochastic factor.

8. The program of claim 1, wherein the evaluation of the score function for the first schedule includes selecting one of a plurality of predetermined values corresponding to distinct staffing levels for an interval in the first schedule.

9. The program of claim 1, wherein the different first shifts further comprise a subset of the plurality of agents and all time slots in the schedule for which the subset of the plurality of agents can work.

10. A computer readable medium having a computer program for optimizing a schedule for scheduling a set of agents within a call center, the program for performing the steps of:
    generating a preliminary schedule for the set of agents within the call center from an agent list, agent staffing requirements, and at least one rule specified by a user, including,
        displaying a current rule fragment that is a portion of a completed rule used to generate the preliminary schedule for the set of agents within the call center;

accepting user input to create the completed rule from the rule fragment, wherein user input includes a selection from a displayed list, and a value directly entered by the user;

accepting a tolerance input by the user, wherein the tolerance is placed on the completed rule;

applying branching rules to previous user selections, such that future selection lists may be generated based on the previous user selections; and converting the completed rule into an internal representation suitable for input into a resource scheduling system for generating the preliminary schedule, wherein the preliminary schedule comprises a plurality of shifts assigning the set of agents to slots and to break offset values;

removing from the preliminary schedule a first shift comprising a first agent of the set of agents;

responsive to removing the first shift from the preliminary schedule, generating a plurality of first schedules having zero or more different first shifts added, wherein the different first shifts comprise time slots in the plurality of first schedules for which the first agent can work, and wherein the different first shifts are break-unspecified shifts and have indeterminate break times;

evaluating a score function for each of the plurality of first schedules based on the indeterminate break times;

selecting a second schedule from among the plurality of first schedules, wherein the second schedule is characterized by a value of the score function; and scheduling the set of agents in accordance with the second schedule.

11. The program of claim 10, wherein generating an initial schedule according to at least one rule further comprises accessing a dynamic database to populate the displayed lists depending on current values in the dynamic database.

12. The program of claim 10, wherein generating an initial schedule according to at least one rule further comprises assigning the completed rule to at least one agent of the set of agents.

13. The program of claim 10 further comprising removing from the preliminary schedule a second shift comprising a second agent, wherein the different first shifts comprise time slots in the plurality of first schedules for which the second agent can work, and scheduling the second agent.

14. A system for generating a schedule for a plurality of agents within a call center, comprising:

an interface system configured to generate at least one rule, the interface system comprising, at least one display device configured to display a current rule fragment that is a portion of a completed used in generating a schedule for the plurality of gents within the call center, at least one input device configured to receive user input to create the completed rule from the rule fragment, wherein user input includes, a selection from a displayed list, a value directly entered by a user, at least one self-referential constraint imposed on the completed rule, wherein the at least one self-referential constraint is assignable to at least one agent of the plurality of agents to be scheduled within the call center; and at least one self-referential tolerance imposed on the completed rule;

a processor configured to apply branching rules to previous user selections, such that future selection lists may be generated based on the previous user selections, and a conversion processing element configured to convert the completed rule into an internal representation suitable for input into a resource scheduling system for generating an initial schedule for the plurality of agents within the call center; and a resource scheduling system configured to generate an optimized schedule from the initial schedule, including, removing a shift from the initial schedule, thereby creating a shift-reduced schedule, wherein the shift comprises at least one agent, at least one time slot, and at least one break offset value, wherein the schedule comprises a plurality of shifts assigning the at least one agent of the plurality of agents to time slots and to break offset values;

creating a plurality of first schedules for the plurality of agents, the plurality of first schedules including adding an array of different first shifts individually to the shift-reduced schedule, wherein the first shifts are break-unspecified shifts and have indeterminate break times;

evaluating a score function for each of the plurality of first schedules, wherein the first schedules have different first shifts added, wherein the different first shifts comprise all time slots in the schedule for which the agent can work;

selecting a second schedule from among the plurality of first schedules, wherein the second schedule is characterized by a value of the score function; and scheduling the plurality of agents in accordance with the optimized schedule.

15. The system of claim 14, wherein interface system further comprises a dynamic database, wherein generating at least one rule further comprises accessing the dynamic database to populate the displayed lists depending on current values in the dynamic database.

16. A computer-readable medium, having instructions stored thereon, which when executed, cause at least one processor to:

generate an initial schedule for agents within a call center according to at least one rule, comprising, displaying a current rule fragment that is a portion of a completed rule used to generate the initial schedule for the agents within the call center;

accepting user input to create the completed rule from the rule fragment, wherein user input includes a selection from a displayed list, and a value directly entered by a user;

accepting a tolerance input by the user;

applying branching rules to previous user selections, such that future selection lists may be generated based on the previous user selections; and converting the completed rule into an internal representation suitable for input into a resource scheduling system for generating the initial schedule;

remove a shift from the initial schedule, thereby creating a shift-reduced schedule, wherein the shift comprises at least one agent, at least one time slot, and at least one break offset value, wherein the schedule comprises a plurality of shifts assigning the agents to time slots and to break offset values;

create a plurality of first schedules for the agents within the call center, including adding an array of different first shifts individually to the shift-reduced schedule, wherein the first shifts are break-unspecified shifts and have indeterminate break times;

evaluate a score function for each of the plurality of first schedules, wherein the first schedules have different first shifts added, wherein the different first shifts comprise all time slots in the schedule for which the agent can work;

select a second schedule from among the plurality of first schedules, wherein the second schedule is characterized by a value of the score function; and schedule the agents in accordance with the second schedule.

17. The computer-readable medium of claim 16, wherein generating an initial schedule according to at least one rule further comprises accessing a dynamic database to populate the displayed lists depending on current values in the dynamic database.

18. The computer-readable medium of claim 16, wherein generating an initial schedule according to at least one rule further comprises assigning the completed rule to at least one agent of the plurality of agents.

19. The computer-readable medium of claim 16, further comprising repeatedly removing, adding, evaluating, and selecting until a locally optimal schedule is obtained.

20. The computer-readable medium of claim 16, wherein the instruction, when executed, further cause the at least one processor to:

generate at least one break-unspecified shift, including unscheduling at least one break to make the breaks indeterminate;

create a plurality of first break times for each break-unspecified shift, including adding an array of different first break offset values for each break-unspecified shift, evaluate a score function for each of the plurality of first break times; and select a schedule having first break times from the first schedules having the first break times, wherein the second break times are characterized by second scores.

21. The computer-readable medium of claim 20 wherein the plurality of predetermined values comprises four values corresponding to whether the interval in the first schedule corresponds to a first threshold of being understaffed, a second threshold of being understaffed, a first threshold of being overstaffed, or a second threshold of being overstaffed.

22. The computer-readable medium of claim 16, wherein the evaluation of the score function for the first schedule includes the calculation of a stochastic factor.

23. The computer-readable medium of claim 16, wherein the evaluation of the score function for the first schedule includes selecting one of a plurality of predetermined values corresponding to distinct staffing levels for an interval in the first schedule.

24. The computer-readable medium of claim 16, wherein the different first shifts further comprise a subset of the at least one agent and all time slots in the schedule for which the subset of agents can work.

* * * * *